United States Patent
Nomura

(10) Patent No.: US 9,599,635 B2
(45) Date of Patent: Mar. 21, 2017

(54) MOTION ANALYSIS APPARATUS AND MOTION ANALYSIS METHOD

(71) Applicant: Seiko Epson Corporation, Tokyo (JP)

(72) Inventor: Kazuo Nomura, Shiojiri (JP)

(73) Assignee: Seiko Epson Corporation (JP)

( * ) Notice: Subject to any disclaimer, the term of this patent is extended or adjusted under 35 U.S.C. 154(b) by 447 days.

(21) Appl. No.: 14/176,468

(22) Filed: Feb. 10, 2014

(65) Prior Publication Data

US 2014/0229135 A1    Aug. 14, 2014

(30) Foreign Application Priority Data

Feb. 14, 2013 (JP) .................................. 2013-026328

(51) Int. Cl.
    *G01P 21/00* (2006.01)

(52) U.S. Cl.
    CPC .................................... *G01P 21/00* (2013.01)

(58) Field of Classification Search
    CPC ............................. G01P 21/00; G01C 25/005
    USPC .............. 702/87, 94, 142, 151, 85, 145, 155
    See application file for complete search history.

(56) References Cited

U.S. PATENT DOCUMENTS

| | | | | |
|---|---|---|---|---|
| 7,359,816 B2 * | 4/2008 | Kumar | ................. | G01C 25/005 702/85 |
| 7,516,039 B2 * | 4/2009 | McKitterick | ............ | G01C 7/06 180/116 |
| 7,672,781 B2 * | 3/2010 | Churchill | ............. | G01C 21/165 701/468 |
| 7,843,425 B2 * | 11/2010 | Lu | ........................... | G06F 3/011 341/20 |
| 8,362,942 B2 * | 1/2013 | McNeill | ......................... | 342/22 |
| 8,566,032 B2 * | 10/2013 | Chowdhary | .......... | G01C 21/005 701/121 |
| 8,666,695 B2 * | 3/2014 | Han | ....................... | G06F 3/017 700/66 |
| 8,818,751 B2 * | 8/2014 | Van Acht | ............. | A61B 5/1038 33/301 |
| 8,990,042 B2 * | 3/2015 | Han | ....................... | G06F 3/017 700/66 |
| 9,063,232 B2 * | 6/2015 | McNeill | ..................... | G01S 7/35 |
| 9,257,054 B2 * | 2/2016 | Coza | ................... | G09B 19/0038 |
| 2004/0169636 A1 * | 9/2004 | Park | ......................... | G06F 3/011 345/156 |

(Continued)

FOREIGN PATENT DOCUMENTS

| | | |
|---|---|---|
| JP | 04141186 | 5/1992 |
| JP | 2001-242192 A | 9/2001 |

(Continued)

*Primary Examiner* — Carol S Tsai
(74) *Attorney, Agent, or Firm* — Harness, Dickey & Pierce, P.L.C.

(57) ABSTRACT

A motion analysis apparatus includes: a threshold value determining section that determines whether the amount of inertia in a first period is within a threshold value range; a bias value setting section that sets, if it is determined that the amount of inertia is within the threshold value range, a bias value included in the amount of inertia on the basis of a first average value that is an average value of the amount of inertia detected in the first period; and an analysis information calculating section that analyzes a motion of a measurement object using correction data from which the bias value is removed.

6 Claims, 12 Drawing Sheets

(56) References Cited

U.S. PATENT DOCUMENTS

| | | | | |
|---|---|---|---|---|
| 2007/0032951 A1* | 2/2007 | Tanenhaus | | G01C 21/16 702/151 |
| 2009/0262005 A1* | 10/2009 | McNeill | | G01S 7/35 342/22 |
| 2009/0262006 A1* | 10/2009 | McNeill | | G01S 7/35 342/22 |
| 2012/0157241 A1 | 6/2012 | Nomura et al. | | |
| 2013/0111993 A1* | 5/2013 | Wang | | G01C 21/16 73/514.01 |
| 2013/0131972 A1* | 5/2013 | Kumar | | G01C 21/165 701/409 |
| 2013/0244211 A1* | 9/2013 | Dowling | | G06F 19/3481 434/247 |
| 2013/0274040 A1* | 10/2013 | Coza | | G09B 19/0038 473/570 |
| 2013/0274587 A1* | 10/2013 | Coza | | A61B 5/6804 600/409 |
| 2013/0274904 A1* | 10/2013 | Coza | | G06F 3/011 700/91 |
| 2013/0282326 A1* | 10/2013 | Kim | | G01C 19/5776 702/142 |
| 2013/0300573 A1* | 11/2013 | Brown | | A61B 5/1113 340/870.01 |
| 2014/0203970 A1* | 7/2014 | Taylor | | G01C 21/16 342/378 |
| 2014/0266160 A1* | 9/2014 | Coza | | G01B 7/003 324/207.11 |
| 2016/0121164 A1* | 5/2016 | Coza | | G09B 19/0038 473/570 |

FOREIGN PATENT DOCUMENTS

| | | |
|---|---|---|
| JP | 2004-024488 A | 1/2004 |
| JP | 2008-073210 A | 4/2008 |
| JP | 2009-125507 A | 6/2009 |
| JP | 2010-110382 A | 5/2010 |
| JP | 2012-130414 A | 7/2012 |
| WO | WO-2011-123149 A1 | 10/2011 |

* cited by examiner

| MOTION TYPE | ATTACHMENT POSITION | TIME LENGTH | THRESHOLD VALUE |
|---|---|---|---|
| GOLF | SHAFT | 500 | 3.0 |
| TENNIS | GRIP END | 200 | 0.7 |
| RUNNING | UPPER ARM | 500 | 4.0 |
| | FOREARM | 500 | 4.0 |
| | THIGH | 400 | 2.0 |
| | LOWER THIGH | 400 | 1.5 |

MOTION ANALYSIS APPARATUS AND MOTION ANALYSIS METHOD

BACKGROUND

1. Technical Field

The present invention relates to a motion analysis apparatus using an inertial sensor and a motion analysis method.

2. Related Art

An apparatus that measures a motion of an object and analyzes the motion is necessary in various fields. For example, in the sport field, motions of a golf club, a tennis racket or the like are measured to analyze a swing track, and motions of arms and legs in running are measured to analyze a running form in some cases. Thus, what needs to be improved becomes clear by reviewing the analysis result and this results in the improvement of athletic performance.

These days, an optical motion capturing apparatus has been proposed as a practical motion analysis apparatus. In this apparatus, in general, a measurement object to which a marker is attached is continuously photographed by an infrared camera or the like, and a movement track of the marker is calculated using the photographed continuous images to analyze a motion of the measurement object (see JP-A-2010-110382). On the other hand, in recent years, an apparatus has been proposed in which a small inertial sensor is attached to a measurement object and a motion of the measurement object is analyzed from output data of the inertial sensor (see JP-A-2008-073210). This apparatus has an advantage in that an infrared camera is not necessary and handling is easy.

When an angular velocity sensor (gyro sensor) is used as an inertial sensor that is attached to a measurement object, for example, it is necessary to remove a bias value of the angular velocity sensor. The bias value collectively refers to errors including a zero bias in an initial state where the angular velocity is zero and a random drift due to external factors such as power fluctuation or temperature change. To calculate the bias value, it is necessary to detect an angular velocity in a state where the measurement object is stopped. However, for example, in the case of sports field, it may be unnatural and difficult to have the measurement object in a temporary stop to obtain the bias value.

SUMMARY

An advantage of some aspects of the invention is to solve at least a part of the problems described above, and the invention can be implemented as the following forms or application examples.

Application Example 1

This application example is directed to a motion analysis apparatus including: a threshold value determining section that determines whether the amount of inertia detected by an inertial sensor in a first period is within a threshold value range; a bias value setting section that sets, if it is determined that the amount of inertia is within the threshold value range, a bias value included in the amount of inertia on the basis of a first average value that is an average value of the amount of inertia detected in the first period; and an analysis information calculating section that analyzes a motion of a measurement object using correction data from which the bias value is removed.

According to the motion analysis apparatus described above, the threshold value determining section determines whether the amount of inertia in a period of a predetermined time length (first period) is within the threshold value range. Thus, the bias value setting section sets the bias value on the basis of the first average value of the amount of inertia during the period in which the amount of inertia is determined to be within the threshold value range. The analysis information calculating section analyzes the motion of the measurement object on the basis of the correction data from which the bias value is removed.

Accordingly, the threshold value determining section may determine that the period in which the amount of inertia is within the threshold value range is a period in which the measurement object is stopped or is in a state close to the stop (hereinafter, referred to as a "stationary state"). Thus, a motion analyzing section may perform a correction process of removing the bias value obtained from the measurement object in the stationary state, and may accurately analyze the motion of the measurement object. Here, as it is determined whether the measurement object is in the stationary state using the first period as a target, a period in which the measurement object is in the stationary state is retrieved on the basis of the detection result of the inertial sensor. As a result, for example, in the sport field, the period in which measurement object is temporarily in the stationary state on a time axis of a series of motions is retrieved to calculate the bias value, and thus, it is not necessary to unnaturally stop the motion to calculate the bias value.

Application Example 2

This application example is directed to the motion analysis apparatus according to the application example described above, wherein the threshold value determining section sets the threshold value with reference to a second average value that is an average value of the amount of inertia which is a detection result of the inertial sensor in the entire period.

According to the motion analysis apparatus described above, the threshold value is set with reference to the average value of the amount of inertia which is the detection result of the inertial sensor in the entire period. Accordingly, it is possible to determine, with high accuracy, that the period in which the amount of inertia is within the threshold value range with reference to the second average value is the period in which the measurement object is in the stationary state.

Application Example 3

This application example is directed to the motion analysis apparatus according to the application example described above, wherein when there is a plurality of the first periods in which the amount of inertia is determined to be within the threshold value range, the bias value setting section sets the bias value on the basis of the first average value in the first period in which a difference between the second average value and the amount of inertia is the smallest.

According to the motion analysis apparatus described above, when there is a plurality of the first periods in which the amount of inertia is determined to be within the threshold value range, the bias value is set on the basis of the average value of the amount of inertial during the period in which the difference between the second average value and the amount of inertia is the smallest. Accordingly, it is possible to set the bias value using an average value of the amount of inertia in a period in which the measurement object maintains the stationary state, to enhance the accuracy of the bias value.

Application Example 4

This application example is directed to the motion analysis apparatus according to the application example described above, wherein the threshold value determining section determines whether a variance value of the amount of inertia detected in the first period is within the threshold value range.

According to the motion analysis apparatus described above, it is determined whether the variance value of the amount of inertia is within the threshold value range. Accordingly, it is possible to determine, with high accuracy, that the period in which the variance value of the amount of inertia is within the threshold value range is the period in which the measurement object is in the stationary state.

Application Example 5

This application example is directed to the motion analysis apparatus according to the application example described above, wherein when there is a plurality of the first periods in which the variance value is determined to be within the threshold value range, the bias value setting section sets the bias value on the basis of the first average value in the first period in which the maximum variance value of the amount of inertia is the smallest.

According to the motion analysis apparatus described above, when there is a plurality of the first periods in which the variance value is determined to be within the threshold value range, the bias value is set on the basis of the average value of the amount of inertia during the period in which the maximum variance value is the smallest. Accordingly, it is possible to set the bias value using an average value of the amount of inertia in a period in which the measurement object maintains the stationary state, to enhance the accuracy of the bias value.

Application Example 6

This application example is directed to the motion analysis apparatus according to the application example described above, wherein at least one of the first period and the threshold value is specified based on the type of a motion of the measurement object.

According to the motion analysis apparatus described above, the first period and the threshold value are specified based on the motion type. For example, the first period is short with respect to an exercise large in motion, and is long with respect to an exercise small in motion. Further, the threshold value is reduced with respect to an exercise that demands high accuracy. According to this configuration, it is possible to accurately determine the stationary state of the measurement object.

Application Example 7

This application example is directed to the motion analysis apparatus according to the application example described above, wherein at least one of the first period and the threshold value is specified on the basis of a position to which the inertial sensor is attached.

According to the motion analysis apparatus described above, the first period and the threshold value are specified based on the position to which the inertial sensor is attached. For example, the first period is short when the inertial sensor is attached to a portion large in motion, and is long when the inertial sensor is attached to a portion small in motion.

Further, the threshold value is reduced with respect to a portion that demands high accuracy. According to this configuration, it is possible to accurately determine the stationary state of the measurement object.

Application Example 8

This application example is directed to the motion analysis apparatus according to the application example described above, wherein at least one of the first period and the threshold value is set on the basis of a frequency component of a detection result of the inertial sensor.

According to the motion analysis apparatus described above, the first period and the threshold value are set on the basis of the frequency component of the detection result of the inertial sensor. Accordingly, it is possible to set the first period and the threshold value on the basis of the frequency component of the detection result of the inertial sensor without specifying the first period and the threshold value in advance. Further, it is possible to automatically cope with an individual difference between the measurement objects, deviation of the attachment position or the like, and to accurately determine the stationary state of the measurement object.

Application Example 9

This application example is directed to a motion analysis method including: determining whether the amount of inertia detected by an inertial sensor in a first period is within a threshold value range; setting a bias value, if it is determined that the amount of inertia detected in the first period is within the threshold value range, included in the amount of inertia on the basis of a first average value that is an average value of the amount of inertia detected in the first period; and analyzing a motion of a measurement object using correction data from which the bias value is removed.

According to the motion analysis method described above, it is determined whether the amount of inertia in the first period is within the threshold value range on the time axis of the detection result of the inertial sensor. Thus, the bias value is set on the basis of the first average value of the amount of inertia in the first period in which the amount of inertia is determined to be within the threshold value range. Thus, the motion of the measurement object is analyzed on the basis of the correction data from which the bias value is removed.

Accordingly, it is possible to determine that the period in which the amount of inertia is within the threshold value range is a period in which the measurement object is in the stationary state. Thus, it is possible to perform a correction process of removing the bias value obtained from the measurement object in the stationary state, and to accurately analyze the motion of the measurement object. Here, as it is determined whether the measurement object is in the stationary state using the first period as a target, a period in which the measurement object is in the stationary state is retrieved on the basis of the detection result of the inertial sensor. As a result, for example, in the case of sports field, the period in which the measurement object is temporarily in the stationary state on the time axis of a series of motions is retrieved to calculate the bias value, and thus, it is not necessary to unnaturally stop the motion to calculate the bias value.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail. The following embodiments do not improperly limit the content of the invention disclosed in the appended claims, and the entire configuration described in the present embodiment is not limited as a solution of the invention.

First Embodiment

Hereinafter, a motion analysis system according to a first embodiment will be described with reference to the accompanying drawings.

Configuration of Motion Analysis System

First, a configuration of the motion analysis system will be described.

Figure 1:
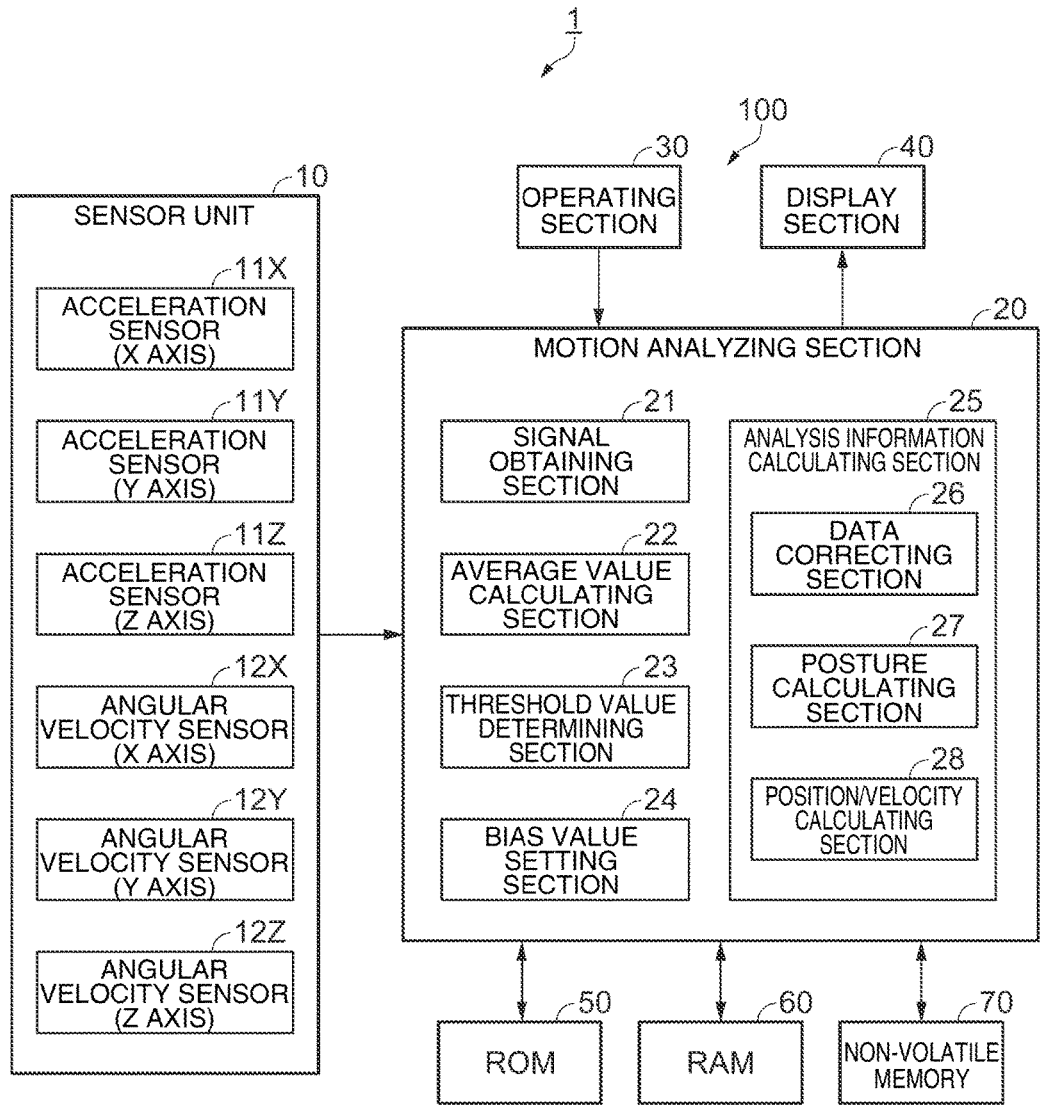
FIG. 1 is a block diagram illustrating a configuration of a motion analysis system.

FIG. 1 is a block diagram illustrating the configuration of the motion analysis system according to the present embodiment. The motion analysis system 1 of the present embodiment includes a sensor unit 10, and a motion analysis apparatus 100 that includes a motion analyzing section 20, an operating section 30, a display section 40, a ROM 50, a RAM 60 and a non-volatile memory 70.

The sensor unit 10 includes acceleration sensors 11X, 11Y and 11Z that are inertial sensors, and angular velocity sensors (gyro sensors) 12X, 12Y and 12Z that are inertial sensors. The acceleration sensors 11X, 11Y and 11Z and the angular velocity sensors 12X, 12Y and 12Z are motion sensors that are attached to a measurement object, and detect a motion of the measurement object to output a signal.

The acceleration sensors 11X, 11Y and 11Z detect accelerations in detection axis directions, and output output signals based on the magnitudes of the detected accelerations. The acceleration sensors 11X, 11Y and 11Z respectively detect accelerations in tri-axial (X axis, Y axis and Z axis) directions for calculation of the position and velocity of the measurement object. On the other hand, the angular velocity sensors 12X, 12Y and 12Z detect angular velocities around detection axes, and output output signals based on the magnitudes of the detected angular velocities. The angular velocity sensors 12X, 12Y and 12Z respectively detect angular velocities in the tri-axial (X axis, Y axis and Z axis) directions for calculation of the posture of the measurement object.

The motion analysis apparatus 100 is a personal computer, an exclusive apparatus or the like, for example. The motion analysis apparatus 100 receives output signals from the sensor unit 10 and performs a motion analysis with respect to the measurement object. In the present embodiment, the sensor unit 10 and the motion analysis apparatus 100 are connected to each other in a wireless manner. However, the connection is not limited to the wireless connection, and a wired connection may be used based on the type of an object to which the sensor unit 10 is attached.

The operating section 30 obtains operation data from a user, and sends the data to the motion analyzing section 20. The operating section 30 is a touch panel display, buttons, keys, a microphone or the like, for example.

The display section 40 displays a processing result in the motion analyzing section 20 as characters, a graph, or an image. The display section 40 is a CRT, an LCD, a touch panel display, a head-mounted display (HMD) or the like, for example. For example, both functions of the operating section 30 and the display section 40 may be realized by one touch panel display.

The ROM 50 is a storage section that stores a program for performing various calculation processes or control processes in the motion analyzing section 20, or various programs, data or the like for realization of application functions.

The RAM 60 is a storage section that is used as a work area of the motion analyzing section 20, and temporarily stores a program or data read from the ROM 50 or the like, data obtained in the operating section 30, a calculation result or the like executed by the motion analyzing section 20 based on various programs.

The non-volatile memory 70 is a recording section that records data that is required to be stored for a long period of time or the like, among data referenced or generated in the process of the motion analyzing section 20. In the non-volatile memory 70, for example, data on a time length of a target period, a threshold value and the like (to be described later) when making reference to a detection result of the angular velocity sensors 12X, 12Y and 12Z are specified and stored in advance.

The motion analyzing section 20 includes a signal obtaining section 21, an average value calculating section 22, a threshold value determining section 23, a bias value setting section 24, an analysis information calculating section 25, and the like. The motion analyzing section 20 performs various processes based on the programs stored in the ROM 50. The motion analyzing section 20 may be realized by a microprocessor such as a CPU, or the like.

The signal obtaining section 21 obtains output signals from the sensor unit 10. The acceleration data (X axis, Y axis and Z axis) detected by the acceleration sensors 11X, 11Y and 11Z and the angular velocity data (X axis, Y axis and Z axis) detected by the angular velocity sensors 12X, 12Y and 12Z are included in the obtained signals, and stored in the RAM 60.

The average value calculating section 22 calculates an average value (a second average value) of the entire angular velocity data (X axis, Y axis and Z axis) and an average value (a first average value) of the angular velocity data (X axis, Y axis and Z axis) detected in the target period in which a reference period is limited, on a time axis of the detection result of the angular velocity sensors 12X, 12Y and 12Z.

The threshold value determining section 23 determines whether the angular velocity data (X axis, Y axis and Z axis) detected in the target period is within a threshold value range on the time axis of the detection result of the angular velocity sensors 12X, 12Y and 12Z. Here, it is determined whether the measurement object is stopped or in a state close to the stop (hereinafter, referred to as a "stationary state") in the target period.

The bias value setting section 24 sets a bias value in the RAM 60 or the non-volatile memory 70 on the basis of the average value of the angular velocity data (X axis, Y axis and Z axis) in the target period calculated by the average value calculating section 22, with respect to the target period in which the measurement object is in the stationary state.

The analysis information calculating section 25 includes a data correcting section 26, a posture calculating section 27, a position/velocity calculating section 28, and the like. The data correcting section 26 performs a correction process of removing the bias value set by the bias value setting section 24, for the angular velocity data (X axis, Y axis and Z axis) detected by the angular velocity sensors 12X, 12Y and 12Z. The posture calculating section 27 performs a process of calculating the posture of the measurement object using the measurement values of the angular velocities obtained from the angular velocity sensors 12X, 12Y and 12Z. The position/velocity calculating section 28 performs a process of calculating the position or velocity of the measurement object using the measurement values of the accelerations obtained from the acceleration sensors 11X, 11Y and 11Z.

Operation of Motion Analysis Apparatus

Next, operation content of the motion analysis apparatus 100 will be described.

Figure 2:
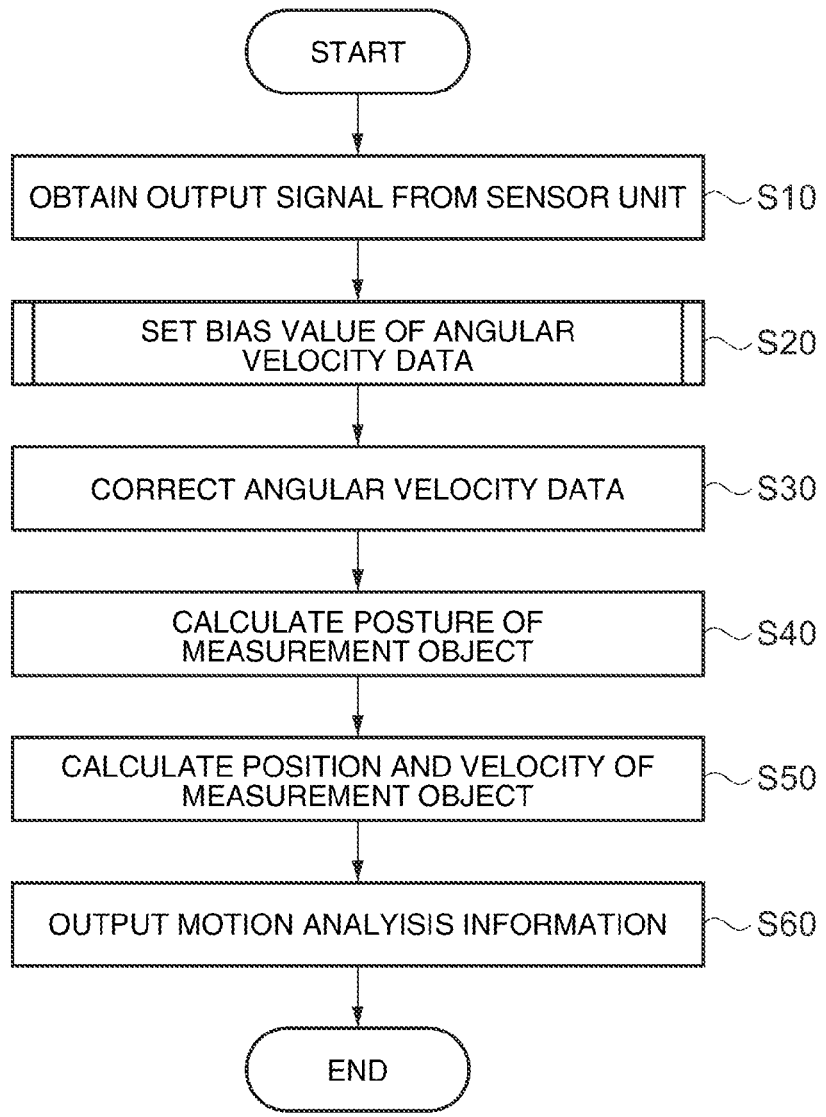
FIG. 2 is a flowchart illustrating an operation of a motion analysis apparatus.

FIG. 2 is a flowchart illustrating an operation of the motion analysis apparatus 100. The operation of the motion analysis apparatus 100 is performed as the motion analyzing section 20 executes the processes based on various programs.

First, the motion analyzing section 20 obtains output signals from the sensor unit 10 attached to the measurement object by the signal obtaining section 21 (step S10).

Figure 3:
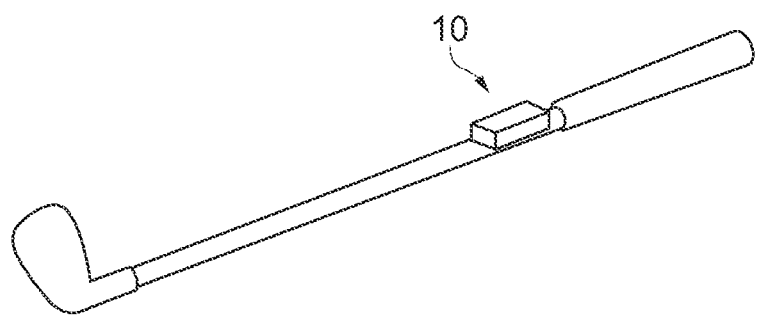
FIG. 3 is a diagram illustrating an example of a sensor unit attached to a golf club.

FIG. 3 is a diagram illustrating an example of the sensor unit 10 attached to a golf club. In FIG. 3, the sensor unit 10 is attached at a position close to a grip, on a shaft of the golf club. Accordingly, in the present embodiment, the golf club becomes the measurement object. A user performs a swing motion while holding the golf club to which the sensor unit 10 is attached. During the swing motion, the signal obtaining section 21 obtains output signals from the sensor unit 10 based on the movement of the shaft of the golf club.

The number of the sensor unit 10 attached to the golf club is not limited to one, and may be two or greater. Further, the attachment position of the sensor unit 10 attached to the golf club is not limited to the example of the shaft shown in FIG. 3. For example, the position may be the grip, the head of the golf club, or an arbitrary portion of the body of the user.

Next, the motion analyzing section 20 sets a bias value included in the angular velocity data of the output signals obtained in step S10 (step S20).

Figure 4:
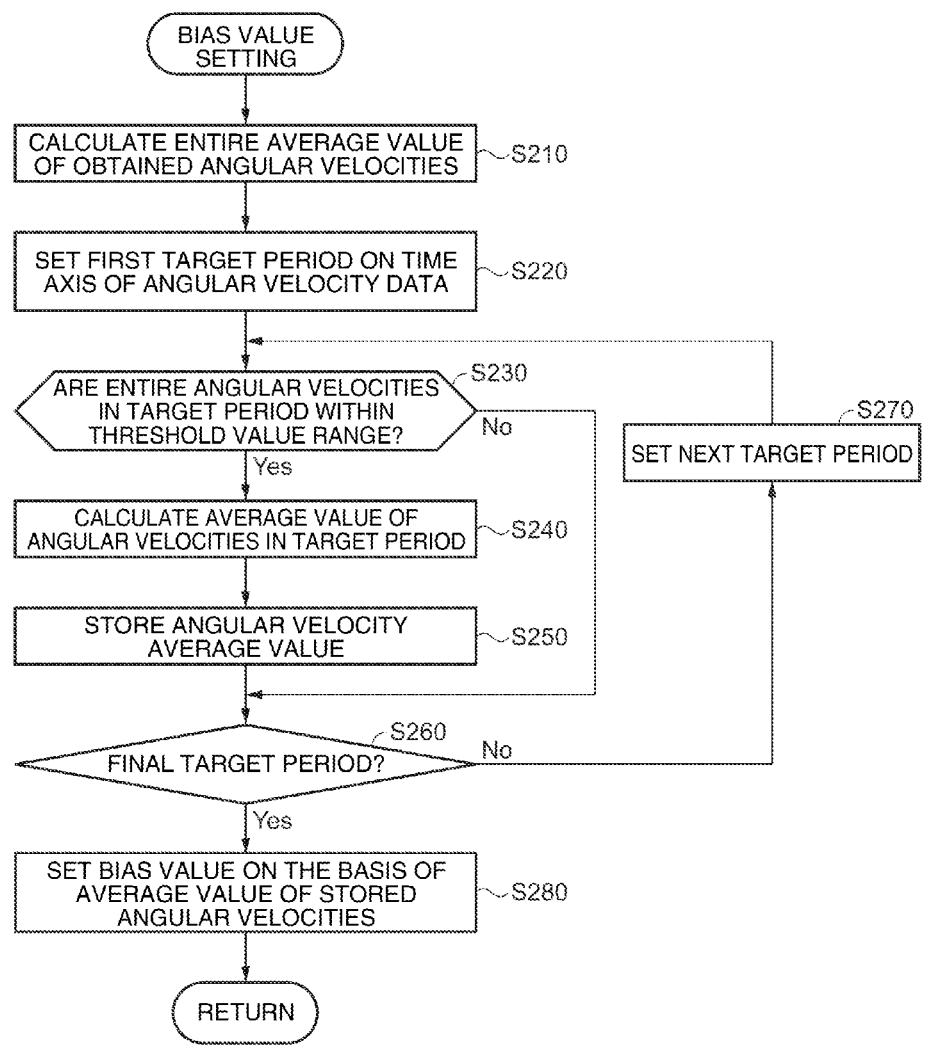
FIG. 4 is a flowchart illustrating details of an operation for setting a bias value of angular velocity data.

FIG. 4 is a flowchart illustrating details of the operation of setting the bias value of the angular velocity data. In the flowchart shown in FIG. 4, first, the motion analyzing section 20 calculates an entire average value of the angular velocities with respect to each of the X axis, Y axis and Z axis, on the basis of the entire angular velocity data obtained in step S10, by the average value calculating section 22 (step S210).

Then, the motion analyzing section 20 sets a first target period (a first period) on a time axis in angular velocity data using the golf swing as a target (step S220). In the present embodiment, the time length of the target period is set to 500 msec, and the point of time when the detection of the angular velocity data is started is set to the first target period.

Then, the motion analyzing section 20 determines whether the angular velocity around the X axis in the target period is within the threshold value range with reference to the entire average value of the angular velocities around the X axis calculated in step S210, by the threshold value determining section 23. Similarly, the motion analyzing section 20 determines whether the angular velocity around the Y axis in the target period is within the threshold value range with reference to the entire average value of the angular velocities around the Y axis, and determines whether the angular velocity around the Z axis in the target period is within the threshold value range with reference to the entire average value of the angular velocities around the Z axis (step S230). Here, if all of the X axial, Y axial and Z axial angular velocities are within the threshold value range, it is determined that the golf club is in the stationary state with respect to the target period. Further, in the present embodiment, assuming that the threshold value is set to 3.0 dps, the motion analyzing section 20 determines whether the angular velocities around the X axis, Y axis and Z axis in the target period are respectively within the range of −3.0 dps to +3.0 dps with reference to the entire average value.

If the entire angular velocities around the X axis, Y axis and Z axis in the target period are within the threshold value range (Yes in step S230), that is, if the target period corresponds to the stationary state, the motion analyzing section 20 calculates an average value of the angular velocities in the target period with respect to each of the X axis, Y axis and Z axis, by the average value calculating section 22 (step S240). Further, for example, calculated each average value is stored in the RAM 60 (step S250), and the procedure goes to step S260.

On the other hand, if any one of angular velocities around the respective X axis, Y axis and Z axis in the target period is not within the threshold value range (No in step S230), that is, if the target period does not correspond to the stationary state, the calculation and storage of the average value in the target period are not performed, and the procedure goes to step S260.

In step S260, the motion analyzing section 20 determines whether the target period in which the process is performed is a final target period on the time axis (step S260).

If the target period is not the final target period (No in step S260), the motion analyzing section 20 sets the next target period of 500 msec that is deviated back on the time axis (step S270), and the procedure returns to step S230. Then, the motion analyzing section 20 determines whether the next target period corresponds to the stationary state.

On the other hand, if the target period is the final target period (Yes in step S260), the motion analyzing section 20 sets each bias value on the basis of the average value of the angular velocities around the X axis, Y axis and Z axis stored in step S250, by the bias value setting section 24 (step S280), and finishes the operation of setting the bias value. Then the procedure returns to the processes of the flowchart in FIG. 2.

If the average value of the angular velocities is not at all stored in step S250, that is, if there is no target period in which the golf club is in the stationary state, for example, a message indicating that the golf club is to be fixed and stopped is displayed on the display section 40.

In the present embodiment, when the bias value is set, the average value of the angular velocities around the X axis, Y axis and Z axis in the target period is set as each bias value as it is. Further, if there are plural average values of the angular velocities stored in step S250, that is, if there are plural target periods corresponding to the stationary state, a target period having a small difference between the average value of the angular velocities in the target period and the entire average value of the angular velocities is selected, and this average value is used as the bias value.

Figure 5:
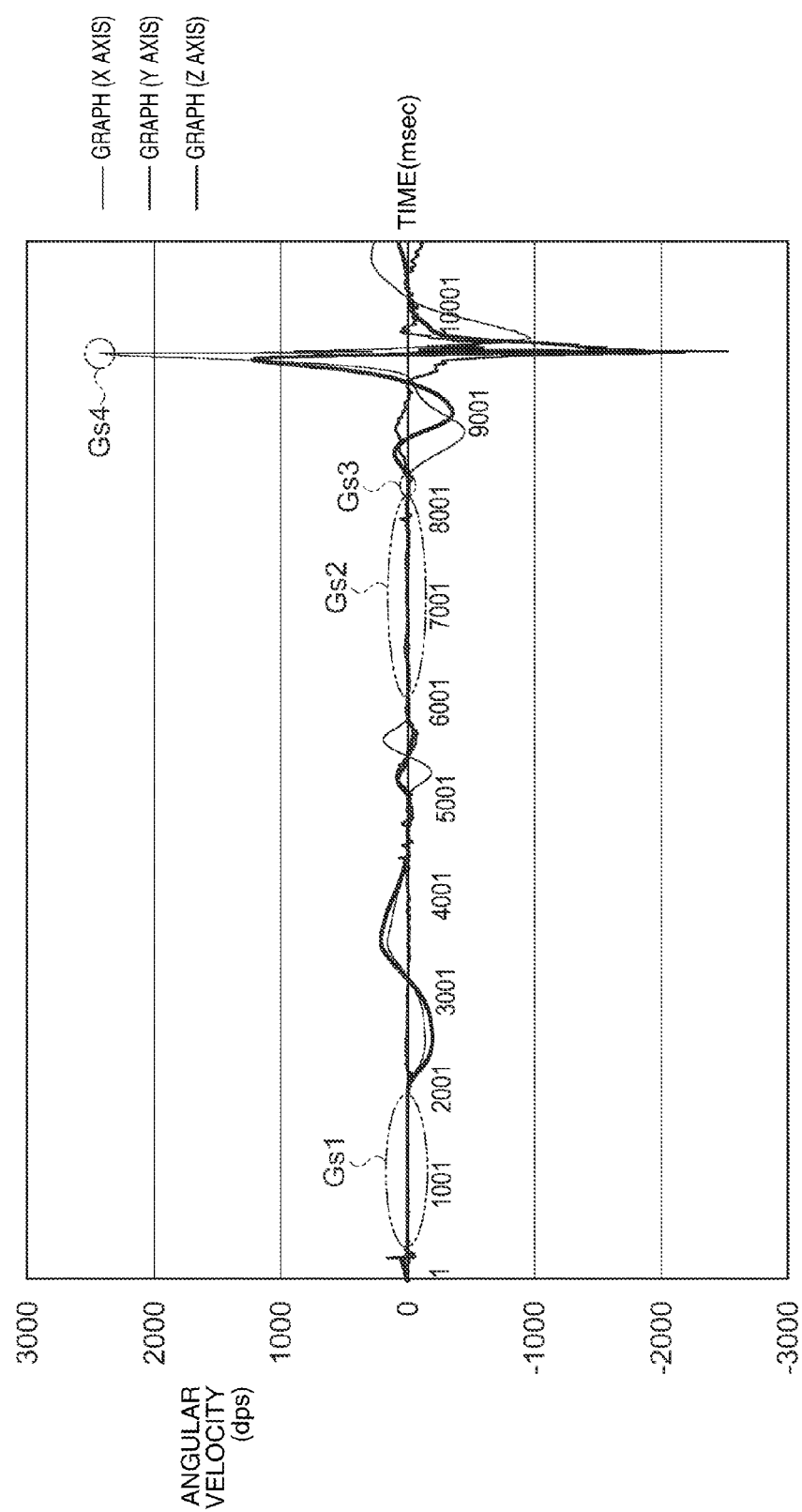
FIG. 5 is a diagram illustrating an example of angular velocity data associated with a motion relating to a golf swing, detected by the sensor unit attached to the golf club.
Figure 6:
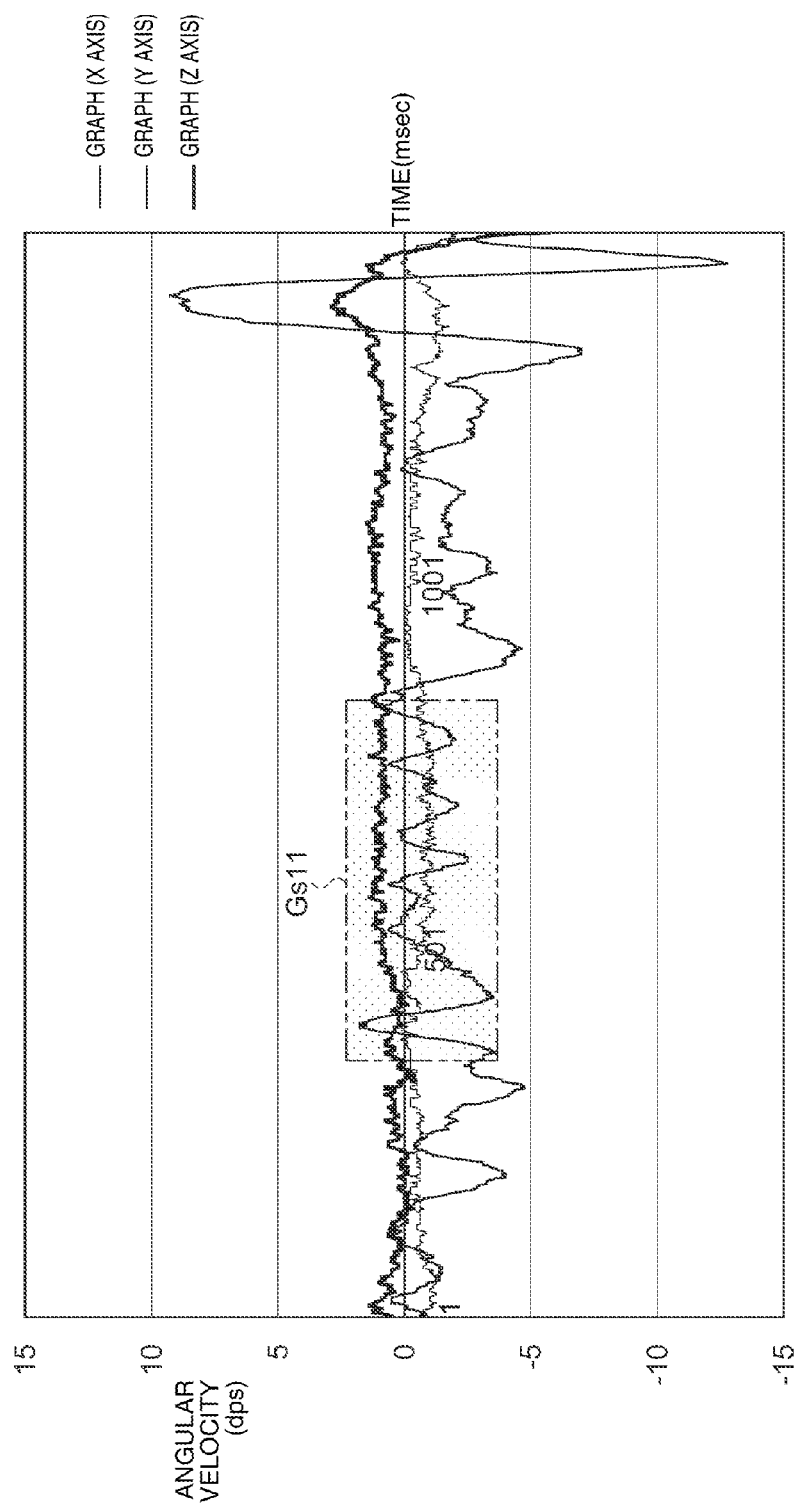
FIG. 6 is an enlarged view of the periphery of a period corresponding to a stationary state in FIG. 5.

FIG. 5 is a diagram illustrating an example of angular velocity data around the X axis, Y axis and Z axis associated with a motion relating to a golf swing, detected by the sensor unit 10 attached to the golf club. In FIG. 5, a graph indicated by a narrow line represents a relationship between elapsed time and angular velocity around the X axis, a graph indicated by a medium line represents a relationship between elapsed time and angular velocity around the Y axis, and a graph indicated by a thick line represents a relationship between elapsed time and angular velocity around the Z axis. Further, with respect to circles Gs1 to Gs4 indicated by two-dot chain lines, the circles Gs1 and Gs2 represent periods when the golf club is in the stationary state before the swing is started. The circle Gs3 represents a swing start timing, and the circle Gs4 represents a ball impact timing. Further, FIG. 6 is an enlarged view of the periphery of the period in which the golf club is in the stationary state indicated by the circle Gs1 in FIG. 5.

In step S230 in FIG. 4, the threshold value determining section 23 determines whether each angular velocity around the X axis, Y axis and Z axis is within the threshold value range of −3.0 dps to +3.0 dps with reference to the entire average value of the angular velocities, with respect to the target period of the time length of 500 msec. As a result, as shown in FIG. 5, in the period of the circle Gs1 when the golf club is in the stationary state, it is determined that the entire angular velocities around the X axis, Y axis and Z axis are within the threshold value range of −3.0 dps to +3.0 dps with reference to the entire average value of the angular velocities, in the target period of a shaded portion Gs11 of time length of 500 msec, as shown in FIG. 6. Further, in step S280 in FIG. 4, the bias value setting section 24 sets the average value of the angular velocities in the shaded portion Gs11 as the bias value around the X axis, Y axis and Z axis, with respect to the angular velocity sensors 12X, 12Y and 12Z.

The average value of the angular velocities may not be set as the bias value as it is, and for example, the bias value may be calculated by performing a process such as an arithmetic operation for each average value with a predetermined integer. If there are plural target periods when the angular velocities are within the threshold value range, the target period may not be selected on the basis of the difference between the average value of the angular velocities and the entire average value of the angular velocities as described above. In this case, for example, the target period may be selected based on the position on the time axis, for example, the proximity or the distance to the point of time when the detection of the angular velocity data is started, or all the average values in the target period in which the angular velocities are within the threshold value range may be added up to further calculate an average value, which may be set as the bias value.

Returning to FIG. 2, in step S30, the motion analyzing section 20 performs a correction process of removing the bias value included in the angular velocity data, by the data correcting section 26 of the analysis information calculating section 25. Here, the correction is performed by performing a calculation process of removing the bias value set in step S20, for the angular velocity data on the output signals obtained in step S10.

Then, the motion analyzing section 20 calculates the posture of the measurement object on the basis of the angular velocity data corrected in step S30, by the posture calculating section 27 of the analysis information calculating section 25 (step S40).

In the present embodiment, the motion analyzing section 20 calculates the posture of the shaft of the golf club on the basis of the corrected angular velocity data.

Then, the motion analyzing section 20 calculates the position and velocity of the measurement object on the basis of the acceleration data included in the output signals from the sensor unit 10 obtained in step S10, by the position/velocity calculating section 28 of the analysis information calculating section 25 (step S50). For example, the position/velocity calculating section 28 may calculate the direction of the gravity acceleration from the posture of the measurement object calculated in step S40, may calculate the velocity by performing integration after canceling the gravity acceleration from the acceleration data, and may calculate the position by integrating the velocity again.

In the present embodiment, the motion analyzing section 20 may calculate the position and velocity of the shaft of the golf club on the basis of the acceleration data from the sensor unit 10.

Then, the motion analyzing section 20 displays motion analysis information relating to the golf swing of a user on the display section 40 on the basis of information on the posture, position and velocity of the measurement object calculated in steps S40 and S50 (step S60), and finishes the processes of the flowchart in FIG. 2.

In the above-described embodiment, on the time axis of the detected angular velocity data, the target period (time length of 500 msec) when the golf club is in the stationary state is retrieved. Further, the average value of the angular velocities with respect to the target period in which the golf club is in the stationary state is calculated to be set as the bias value, the correction process of removing the bias value is performed, and then, the motion analysis relating to the golf swing is performed. In this way, since the stationary state is retrieved to be set as the bias value in the series of motions in which the user performs the swing motion while holding the golf club, it is not necessary that the user performs the motion of setting the stationary state of the golf club to set the bias value. As a result, the user can naturally perform the golf swing motion without caring whether the bias value is set.

Second Embodiment

Hereinafter, a motion analysis system according to a second embodiment will be described with reference to the accompanying drawings.

The motion analysis system according to the second embodiment has approximately the same configuration and operation content as the motion analysis system 1 according to the first embodiment described above, but a measurement object to which the sensor unit 10 is attached is different from that of the first embodiment.

Figure 7:
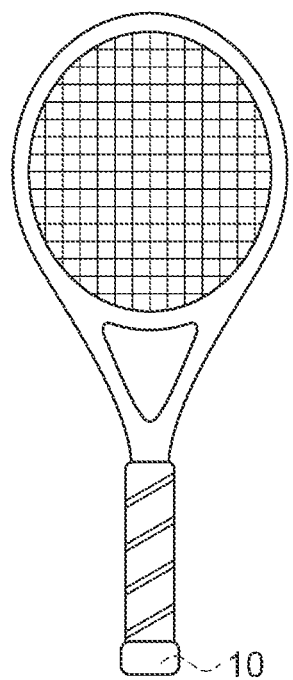
FIG. 7 is a diagram illustrating an example of a sensor unit attached to a tennis racket, according to a second embodiment.

FIG. 7 is a diagram illustrating an example of the sensor unit 10 attached to a tennis racket, according to the second embodiment. In FIG. 7, the sensor unit 10 is attached to a grip end of the tennis racket. Accordingly, in the embodiment, the tennis racket becomes the measurement object. A user performs a stroke motion in a state where the sensor unit 10 is attached to the tennis racket. During the stroke motion, the signal obtaining section 21 obtains output signals from the sensor unit 10 associated with the motion of the grip end of the tennis racket.

Figure 8:
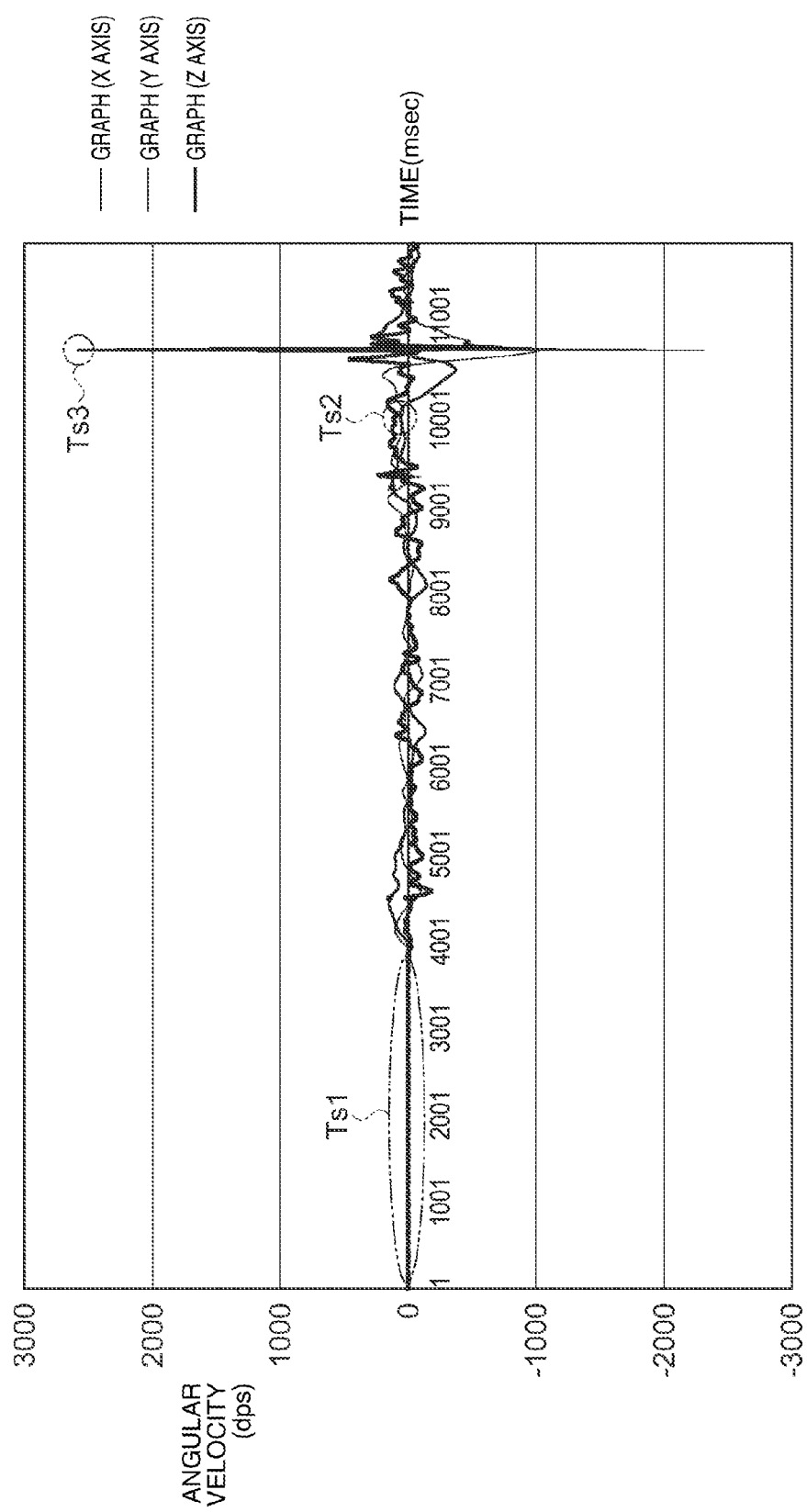
FIG. 8 is a diagram illustrating an example of angular velocity data associated with a motion relating to a stroke, detected by the sensor unit attached to the tennis racket.
Figure 9:
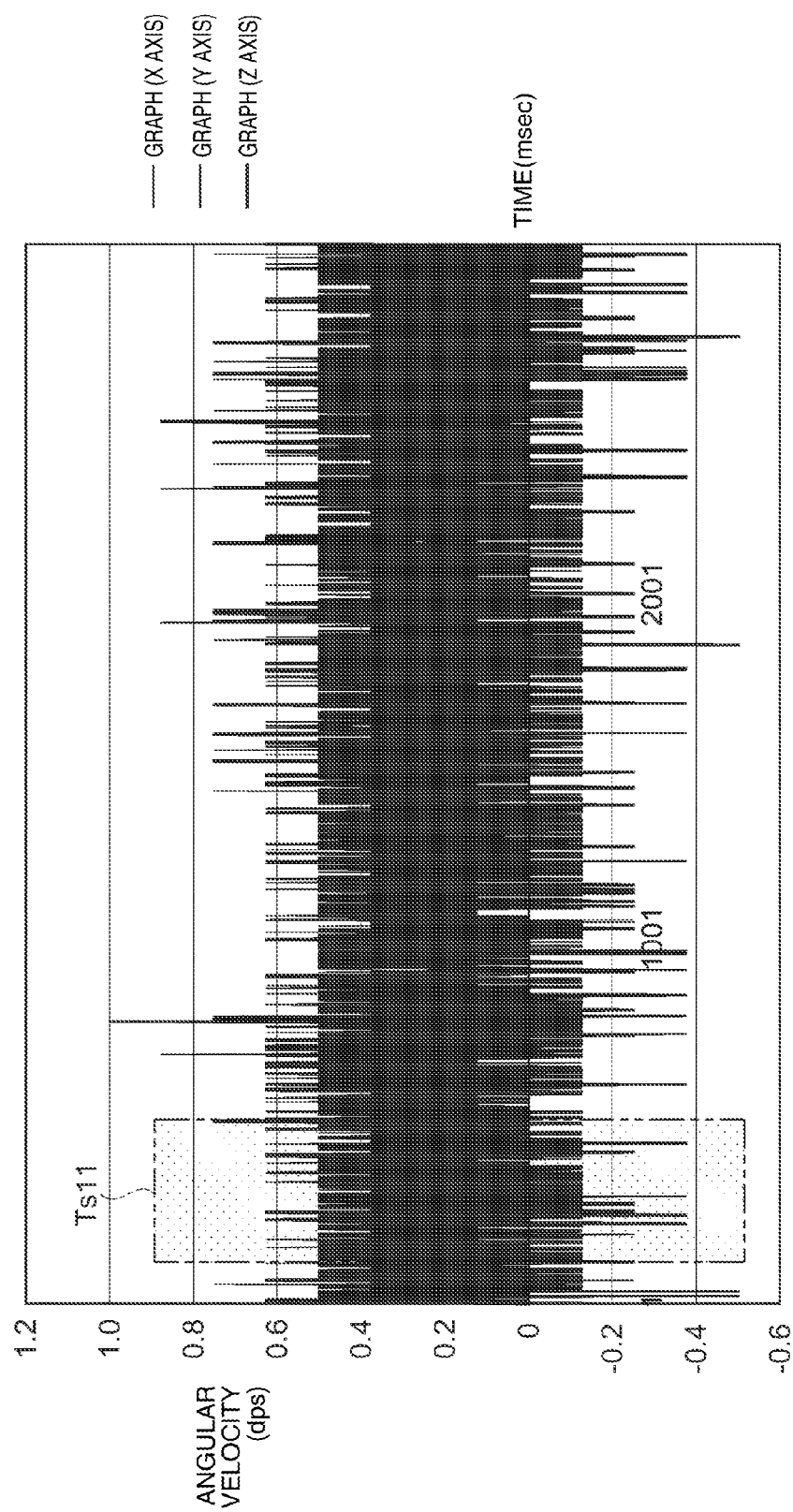
FIG. 9 is an enlarged view of a period corresponding to a stationary state in FIG. 8.

FIG. 8 is a diagram illustrating an example of angular velocity data around the X axis, Y axis and Z axis associated with a motion relating to stroke, detected by the sensor unit 10 attached to the tennis racket. In FIG. 8, a graph indicated by a narrow line represents a relationship between elapsed time and angular velocity around the X axis, a graph indicated by a medium line represents a relationship between elapsed time and angular velocity around the Y axis, and a graph indicated by a thick line represents a relationship between elapsed time and angular velocity around the Z axis. Further, with respect to circles Ts1 to Ts3 indicated by two-dot chain line, the circle Ts1 represents a period in which the tennis racket is in the stationary state before the stroke motion is started. The circle Ts2 represents a take-back start timing, and the circle Ts3 represents a ball impact timing. Further, FIG. 9 is an enlarged view of the period in which the tennis racket is in the stationary state indicated by the circle Ts1 in FIG. 8.

In the operation of the motion analysis apparatus 100 according to the present embodiment, it is possible to apply the flowchart illustrating the operation of the motion analysis apparatus 100 shown in FIG. 2 and the flowchart illustrating details of the operation of setting the bias value of the angular velocity data shown in FIG. 4. However, since the sensor unit 10 is attached to the tennis racket in the present embodiment, in step S220 in FIG. 4, the time length of the target period is set to 200 msec. Further, in step S230 in FIG. 4, the threshold value is set to 0.7 dps, and it is determined whether the angular velocities around the X axis, Y axis and Z axis are within the range of −0.7 dps to +0.7 dps with reference to the entire average value of the angular velocities. That is, in the case of tennis racket, since the stroke motion of the tennis racket has a motion range narrower than that of the swing motion of the golf club and has a lower speed, the time length of the target period is reduced compared with that of the golf club, and the threshold value is also reduced.

In step S230 in FIG. 4, the threshold value determining section 23 determines whether each angular velocity around the X axis, Y axis and Z axis is within the threshold value range of −0.7 dps to +0.7 dps with reference to the entire average value of the angular velocities, with respect to the target period of the time length of 200 msec. As a result, as shown in FIG. 8, in the period of the circle Ts1 when the tennis racket is in the stationary state, it is determined that the entire angular velocities around the X axis, Y axis and Z axis are within the threshold value range of −0.7 dps to +0.7 dps with reference to the entire average value of the angular velocities, in the target period of a shaded portion Ts11 of the time length of 200 msec, as shown in FIG. 9. Further, in step S280 in FIG. 4, the bias value setting section 24 sets the average value of the angular velocities in the shaded portion Ts11 as the bias value around the X axis, Y axis and Z axis, with respect to the angular velocity sensors 12X, 12Y and 12Z of the tennis racket.

Then, the processes of steps S30 to S60 in FIG. 2 are performed to perform the correction process of removing the bias value included in the angular velocity data, to calculate the posture, position and velocity of the tennis racket, and to display motion analysis information relating to the stroke motion of the user on the display section 40. In the present embodiment, the stroke motion of the tennis racket has been described, but the invention is not limited to the stroke motion, and for example, may be applied to a motion such as serve, volley, or smash.

In the above-described embodiment, on the time axis of the detected angular velocity data, the target period (time length of 200 msec) when the tennis racket is in the stationary state is retrieved. Further, the average value of the angular velocities with respect to the target period in which the tennis racket is in the stationary state is calculated to be set as the bias value, the correction process of removing the bias value is performed, and then, the motion analysis relating to the stroke motion of the tennis racket is performed. In this way, since the stationary state is retrieved to be set as the bias value in the series of motions in which the user performs the stroke motion while holding the tennis racket, it is not necessary that the user performs the motion of setting the stationary state of the tennis racket to set the bias value. As a result, the user can naturally perform the stroke motion of the tennis racket without caring whether the bias value is set.

Third Embodiment

Hereinafter, a motion analysis system according to a third embodiment will be described with reference to the accompanying drawings.

The motion analysis system according to the third embodiment has approximately the same configuration and operation content as the motion analysis system 1 according to the first and second embodiments described above, but the number of the sensor unit 10 and the measurement object to which the sensor unit 10 is attached are different from the first and second embodiments. In the present embodiment, in the block diagram illustrating the configuration of the motion analysis system shown in FIG. 1, the plural sensor units 10 are provided, but illustration thereof is omitted.

Figures 10, 11:
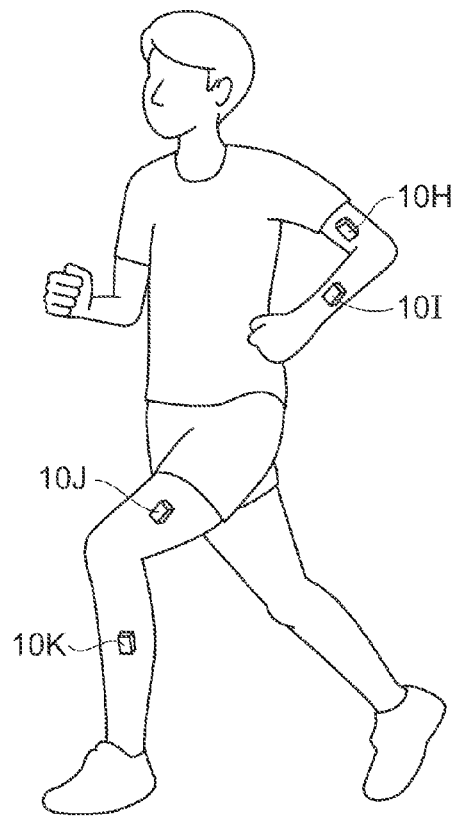
FIG. 10 is a diagram illustrating an example of a sensor unit attached to the body of a user who runs, according to a third embodiment.
FIG. 11 is a table illustrating an example of a time length of a target period and a threshold value in each attachment position for each motion type.

FIG. 10 is a diagram illustrating an example of the sensor unit 10 attached to the body of a user who runs, according to the third embodiment. In FIG. 10, four sensor units 10H, 10I, 10J and 10K are attached to the body of the user. Each of the sensor units 10H, 10I, 10J and 10K is attached to the upper arm, the forearm, the thigh, and the lower thigh of the body of the user. Accordingly, in the present embodiment, the body of the user becomes the measurement object. The user runs in a state where the sensor units 10H, 10I, 10J and 10K are attached to the body. During the running motion, the signal obtaining section 21 obtains output signals from each of the sensor units 10 associated with the motion of each part of the body of the user.

In the operation in the motion analysis apparatus 100 according to the present embodiment, it is possible to apply the flowchart illustrating the operation of the motion analysis apparatus 100 shown in FIG. 2 and the flowchart illustrating the details of the operation of setting the bias value of the angular velocity data shown in FIG. 4 to each of the sensor units 10H, 10I, 10J and 10K at it is. However, since each sensor unit 10 is attached to each part of the body of the user who runs in the present embodiment, the time length of the target period in step S220 in FIG. 4 and the threshold value in step S230 are different in the attachment portions of the body.

FIG. 11 is a table illustrating an example of a time length of a target period and a threshold value in each attachment position for each motion type. In the present embodiment, a motion type of running in FIG. 11 is applied. Further, with respect to the sensor units 10H, 10I, 10J and 10K attached to the respective portions of the upper arm, the forearm, the thigh and the lower thigh of the body of the user, the time lengths of the target periods are 500 msec, 500 msec, 400 msec and 400 msec, respectively, and the threshold values become 4.0 dps, 4.0 dps, 2.0 dps and 1.5 dps, respectively. That is, in the case of running motions, with respect to the upper thigh and the lower thigh that produce large motions compared with the upper arm and the forearm that produce smaller motions, the time length of the target period is reduced compared with the upper arm and the forearm, and accordingly, the threshold value is reduced.

Figure 12:
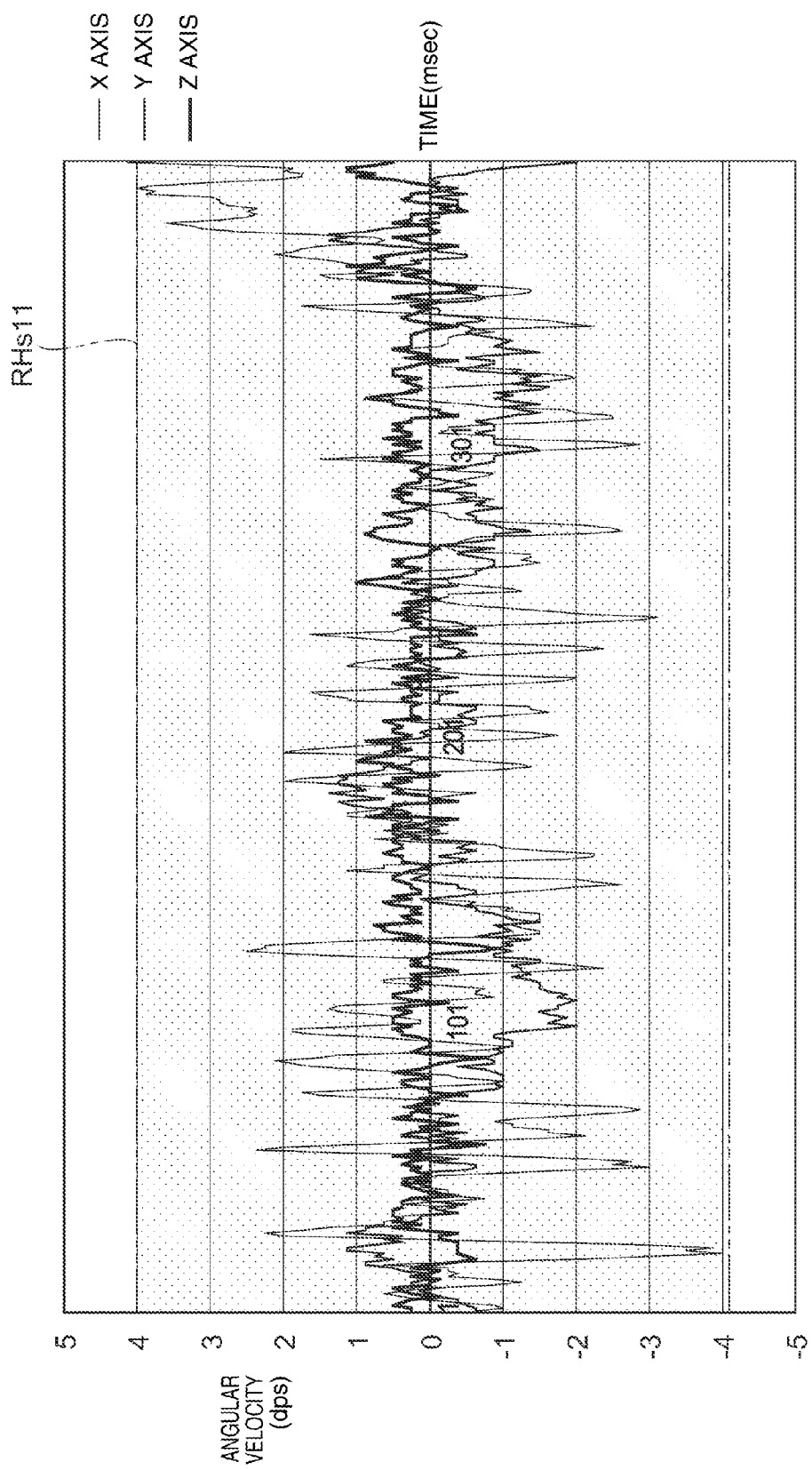
FIG. 12 is a diagram illustrating an example of angular velocity data associated with a running motion, detected by a sensor unit attached to the upper arm of the body.
Figure 13:
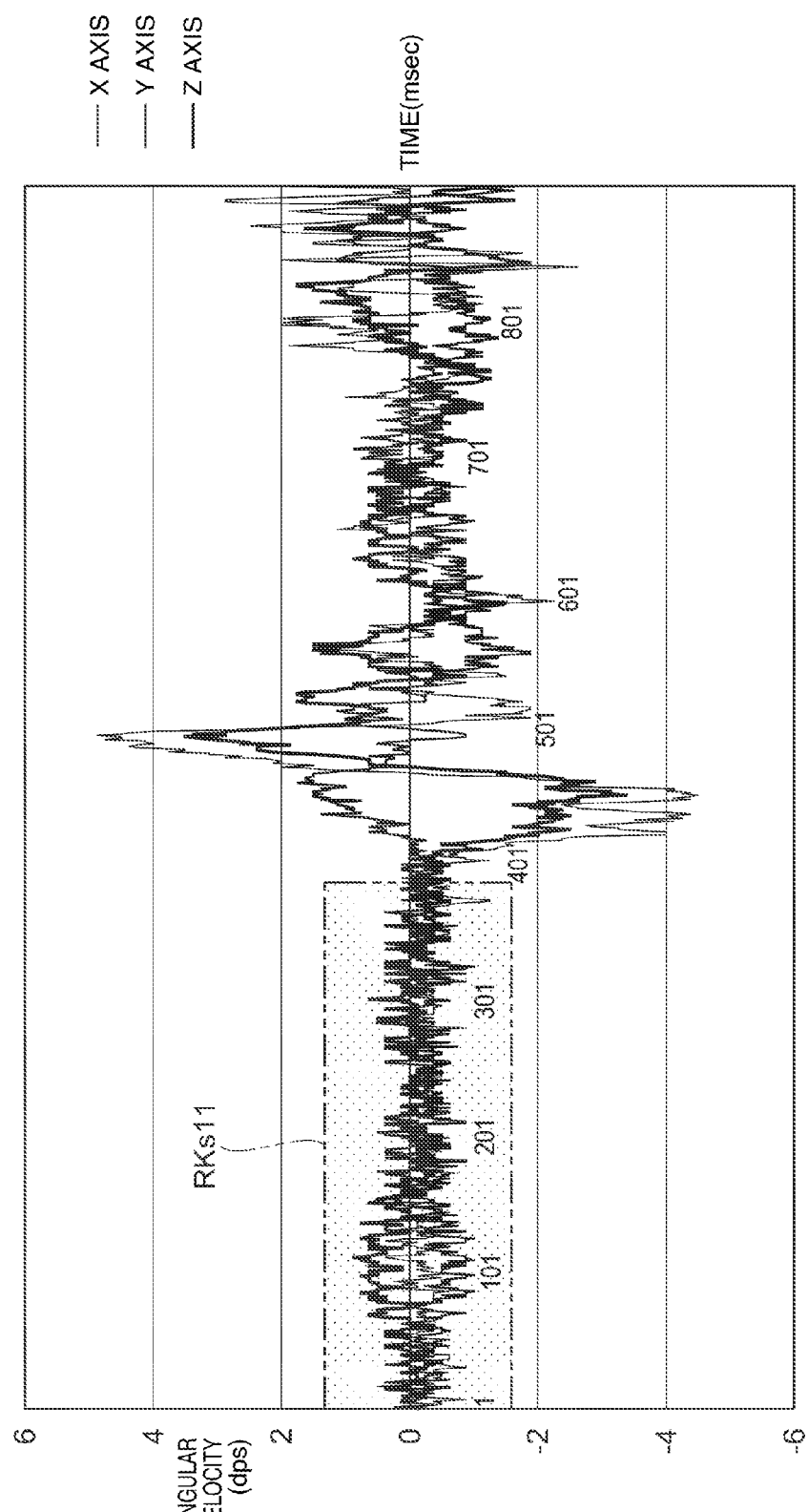
FIG. 13 is a diagram illustrating an example of angular velocity data associated with a running motion, detected by a sensor unit attached to the lower thigh of the body.

FIG. 12 is a diagram illustrating an example of angular velocity data around the X axis, Y axis and Z axis associated with the running motion, detected by the sensor unit 10H attached to the upper arm of the body. FIG. 13 is a diagram illustrating an example of angular velocity data around the X axis, Y axis and Z axis associated with the running motion, detected by the sensor unit 10K attached to the lower thigh of the body. In FIGS. 12 and 13, a graph indicated by a narrow line represents a relationship between elapsed time and angular velocity around the x axis, a graph indicated by a medium line represents a relationship between elapsed time and angular velocity around the Y axis, and a graph indicated by a thick line represents a relationship between elapsed time and angular velocity around the Z axis.

For example, in the sensor unit 10H attached to the upper arm, the threshold value determining section 23 determines whether each angular velocity around the X axis, Y axis and Z axis is within the threshold value range of −4.0 dps to +4.0 dps with reference to the entire average value of the angular velocities, with respect to the target period of the time length of 500 msec. As a result, as shown in FIG. 12, in the target period of a shaded portion RHs11 of time length of 500 msec when the upper arm is in the stationary state, it is determined that the entire angular velocities around the X axis, Y axis and Z axis are within the threshold value range of −4.0 dps to +4.0 dps with reference to the entire average value of the angular velocities. Further, in step S280 in FIG. 4, the bias value setting section 24 sets the average value of the angular velocities in the shaded portion RHs11 as the bias value around the X axis, Y axis and Z axis, with respect to the sensor unit 10H attached to the upper arm.

On the other hand, for example, in the case of the sensor unit 10K attached to the lower thigh, the threshold value determining section 23 determines whether each angular velocity around the X axis, Y axis and Z axis is within the threshold value range of −1.5 dps to +1.5 dps with reference to the entire average value of the angular velocities, with respect to the target period of the time length of 400 msec. As a result, as shown in FIG. 13, in the target period of a shaded portion RKs11 of time length of 400 msec when the lower thigh is in the stationary state, it is determined that the entire angular velocities around the X axis, Y axis and Z axis are within the threshold value range of −1.5 dps to +1.5 dps with reference to the entire average value of the angular velocities. Further, in step S280 in FIG. 4, the bias value setting section 24 sets the average value of the angular velocities in the shaded portion RKs11 as the bias value around the X axis, Y axis and Z axis, with respect to the sensor unit 10K attached to the lower thigh.

Further, the processes of steps S30 to S60 in FIG. 2 are performed to perform the correction process of removing the bias value included in the angular velocity data, with respect to the respective sensor units 10H, 10I, 10J and 10K, to calculate the posture, the position and the velocity of the upper arm, the forearm, the thigh and the lower thigh of the body of the user, and to display motion analysis information relating to the running motion of the user on the display section 40.

In the present embodiment, the running motion has been described, but the invention is not limited to the running motion, and for example, may be applied to competitive walking, skiing, skating, swimming, boating, horse-riding, bicycling or the like. Further, the portions of the body to which the plural sensor units 10 are attached are not limited to the arm and leg, and for example, may be an arbitrary portion such as the wrist, the belly, the back or the head.

In the above-described embodiment, with respect to each sensor unit 10 attached to each portion of the body of the user who runs, the target period in which each portion is in the stationary state is retrieved on the time axis of each detected angular velocity data. Further, the average value of the angular velocities is calculated with respect to the target period in which each portion is in the stationary state to be set as the bias value, the correction process of removing the bias value is performed with respect to each sensor unit 10, and then the motion analysis relating to the running is performed. In this way, since the stationary state is retrieved to be set as the bias value in the series of motions in which the user performs the running motion, it is not necessary that the user stops and takes the stationary state to set the bias value. As a result, the user can naturally perform the running motion without caring whether the bias value is set. Further, as shown in FIG. 11, by specifying the time length of the target period and the threshold value for each motion type and each attachment position, it is possible to flexibly determine the stationary state based on the motion type, attachment positions and the like, and to perform the motion analysis by appropriately removing the bias value.

Modification Example 1

In the above-described embodiments, when the angular velocities of the target period are within the threshold value range with reference to the entire average value of the angular velocities, it is determined that the measurement object is in the stationary state. However, the invention is not limited thereto, and for example, it may be determined that the measurement object is in the stationary state when a variance value of the angular velocities in the target period is within a threshold value range. Here, if there are plural target periods corresponding to the stationary state, a target period in which the maximum variance value of the angular velocities is the smallest is selected. Further, it may be determined that the measurement object is in the stationary state when the average value of the angular velocities in the target period is within a threshold value range. Here, if there are plural target periods corresponding to the stationary state, a target period in which the average value of the angular velocities is the smallest is selected. Further, it may be determined that the measurement object is in the stationary state when the angular velocities in the target period are within the threshold value range with reference to 0. Here, if there are plural target periods corresponding to the stationary state, a target period in which the maximum angular velocity is the smallest is selected.

Modification Example 2

In the above-described embodiments, the time length of the target period and the threshold value are specified based on each attachment position for each motion type. However, the time length and the threshold value may be set on the basis of the obtained angular velocity data, instead of using the time length and the threshold value that are specified in advance. For example, a frequency analysis using Fourier transform may be performed for the obtained angular velocity data to calculate the maximum frequency. Thus, the time length of the target period and the threshold value may be set based on the magnitude of the maximum frequency. In this way, by setting the time length of the target period and the threshold value on the basis of the obtained angular velocity data, it is possible to remove the effort for specifying the time length of the target period and the threshold value in advance, and to reduce the load relating to the motion analysis system. Further, by setting the time length of the target period and the threshold value on the basis of the angular velocity data associated with the motion of the measurement object, it is possible to flexibly cope with an individual difference between the measurement objects, deviation of the attachment position or the like, and to achieve an appropriate motion analysis result with high accuracy.

Further, the time length of the target period and the threshold value may be set based on a dynamic range of the angular velocity sensor or the resolution of an analog digital converter (ADC). Thus, it is possible to achieve an appropriate motion analysis result with high accuracy based on performance of the angular velocity sensor or the like.

Modification Example 3

In the above-described embodiments, when the bias value is set on the basis of the obtained angular velocity data, for example, filtering may be performed for the obtained angular velocity data using a low pass filter that removes a high-pass component, and the bias value may be set on the basis of the angular velocity data passed through the filtering. For example, in the above-described third embodiment, with respect to the sensor unit 10I attached to the forearm of the body, for example, a low pass filter of 20 Hz may be used to perform the filtering, and then, the bias value may be set. Thus, when the motion analysis is performed for the measurement object or the attachment position in which noise easily occurs, since a noise component of the obtained angular velocity data is removed, it is possible to obtain a stable bias value with high accuracy.

The entire disclosure of Japanese Patent Application No. 2013-026328, filed Feb. 14, 2013 is expressly incorporated by reference herein.

What is claimed is:

1. A motion analysis apparatus that is configured to execute processes by a processor, the motion analysis apparatus comprising:
the processor configured to provide:
a threshold value determining section that determines whether the amount of inertia detected by an inertial sensor in a first period is within a threshold value range;
a bias value setting section that sets, if it is determined that the amount of inertia is within the threshold value range, a bias value included in the amount of inertia on the basis of a first average value that is an average value of the amount of inertia detected in the first period; and
an analysis information calculating section that analyzes a motion of a measurement object using correction data from which the bias value is removed,
wherein the threshold value determining section sets the threshold value with reference to a second average value that is an average value of the amount of inertia which is a detection result of the inertial sensor in the entire period, and
when there is a plurality of the first periods in which the amount of inertia is determined to be within the threshold value range, the bias value setting section sets the bias value on the basis of the first average value in the first period in which a difference between the second average value and the amount of inertia is the smallest.

2. The motion analysis apparatus according to claim 1, wherein at least one of the first period and the threshold value is specified based on the type of a motion of the measurement object.

3. The motion analysis apparatus according to claim 1, wherein at least one of the first period and the threshold value is specified on the basis of a position to which the inertial sensor is attached.

4. The motion analysis apparatus according to claim 1, wherein at least one of the first period and the threshold value is set on the basis of a frequency component of a detection result of the inertial sensor.

5. A motion analysis method for causing a processor to execute a process, the motion analysis method comprising executing on the processor the steps of:
determining whether the amount of inertia detected by an inertial sensor in a first period is within a threshold value range;
setting a bias value, if it is determined that the amount of inertia detected in the first period is within the threshold value range, included in the amount of inertial on the basis of a first average value that is an average value of the amount of inertia detected in the first period; and
analyzing a motion of a measurement object using correction data from which the bias value is removed,
wherein the determining step determines whether a variance value of the amount of inertia detected in the first period is within the threshold value range, and
when there is a plurality of the first periods in which the variance value is determined to be within the threshold value range, the setting step sets the bias value on the basis of the first average value in the first period in which the maximum variance value of the amount of inertia is the smallest.

6. A motion analysis apparatus that is configured to execute processes by a processor, the motion analysis apparatus comprising:
the processor configured to provide:
a threshold value determining section that determines whether the amount of inertia detected by an inertial sensor in a first period is within a threshold value range;
a bias value setting section that sets, if it is determined that the amount of inertia is within the threshold value range, a bias value included in the amount of inertia on the basis of a first average value that is an average value of the amount of inertia detected in the first period; and an analysis information calculating section that analyzes a motion of a measurement object using correction data from which the bias value is removed, wherein the threshold value determining section determines whether a variance value of the amount of inertia detected in the first period is within the threshold value range, and when there is a plurality of the first periods in which the variance value is determined to be within the threshold value range, the bias value setting section sets the bias value on the basis of the first average value in the first period in which the maximum variance value of the amount of inertia is the smallest.

* * * * *